United States Patent
Vier

(10) Patent No.: US 9,535,457 B1
(45) Date of Patent: Jan. 3, 2017

(54) DOCKING STATION WITH IMPROVED LATCHING MECHANISM

(71) Applicant: Bradford Edward Vier, Austin, TX (US)

(72) Inventor: Bradford Edward Vier, Austin, TX (US)

(73) Assignee: Xplore Technologies Corp., Austin, TX (US)

( * ) Notice: Subject to any disclaimer, the term of this patent is extended or adjusted under 35 U.S.C. 154(b) by 0 days.

(21) Appl. No.: 14/667,149

(22) Filed: Mar. 24, 2015

Related U.S. Application Data

(60) Provisional application No. 61/969,663, filed on Mar. 24, 2014.

(51) Int. Cl.
  *G06F 1/20* (2006.01)
  *G06F 1/16* (2006.01)

(52) U.S. Cl.
  CPC .................................... *G06F 1/1632* (2013.01)

(58) Field of Classification Search
  CPC ............................... G06F 1/1632; H05K 7/20
  USPC ........................................ 361/679.43, 679.58
  See application file for complete search history.

(56) References Cited

U.S. PATENT DOCUMENTS

| | | | |
|---|---|---|---|
| 5,793,614 A * | 8/1998 | Tollbom | H05K 7/1409 361/725 |
| 8,098,488 B2 | 1/2012 | Lewandowski et al. | |
| 2007/0296224 A1* | 12/2007 | Courter | E05B 17/0029 292/109 |
| 2009/0213536 A1* | 8/2009 | Lewandowski | G06F 1/1632 361/679.43 |

FOREIGN PATENT DOCUMENTS

EP 2570884 3/2013

* cited by examiner

*Primary Examiner* — Dion R Ferguson
*Assistant Examiner* — Mandeep S Buttar
(74) *Attorney, Agent, or Firm* — Egan, Peterman, Enders & Huston LLP

(57) ABSTRACT

According to one embodiment, a docking station for a portable device is provided with an improved latching mechanism for securing the portable device within the docking station. In general, the latching mechanism may comprise a pivotable lever and a larch assembly that operate together as a cam-follower mechanism. The pivotable lever may have a curved lower surface and contoured upper surface, and may be generally configured to rotate about a rotational axis when a back surface of the portable device contacts and pushes against the curved lower surface of the pivotable lever. The latch assembly may be generally configured to translate a rotational motion of the pivotable lever into a linear motion, which causes a hidden latch portion of the latch assembly to extend out of the docking station for securing the portable device within the docking station.

20 Claims, 6 Drawing Sheets

DOCKING STATION WITH IMPROVED LATCHING MECHANISM

PRIORITY CLAIM

The present application claims priority to U.S. Provisional Application No. 61/969,663 filed Mar. 24, 2014.

BACKGROUND OF THE INVENTION

1. Field of the Invention

The present invention relates to docking stations for portable electronic devices. More specifically, the present invention relates to a docking station with a CAM operated latch for securing a portable electronic device against the docking station.

2. Description of the Related Art

The following descriptions and examples are not admitted to be prior art by virtue of their inclusion within this section.

Portable computers, including laptop computers, tablet PCs, and personal digital assistants (PDAs), allow computer users to utilize many of the functions of a personal computer while facilitating freedom of movement about the workplace. Portable computers are generally lightweight and compact, but may compare unfavorably to desktop computers in some respects because they are generally equipped with smaller keyboards and displays. Further, some portable computers may not have a keyboard, mouse, printer ability, local area network (LAN) connection, or an optical drive. To overcome these shortcomings, many portable computer users connect their portable computer to a docking station when using their computer in an office environment. The docking station can equip the portable computer with most of the characteristics of a desktop computer. For example, a docking station typically has a power source to charge the battery of the portable computer in addition to numerous ports that provide connectivity to local area networks and peripheral devices, such as optical drives, monitors, printers, keyboards, and mice. In addition to portable computers, other portable electronic devices such as smart phones, portable music players (e.g., an mp3 player), e-readers, netbooks, etc. may utilize docking stations for providing power, charging batteries or providing connectivity to networks or peripherals. As used herein, the term "portable device" refers to any portable computer or portable electronic device that can be docked to a docking station.

Outside of the office environment, ruggedized docking stations are often needed to constrain the portable computer in all six axes of freedom. For example, it is often desirable to secure a portable computer within a ruggedized docking station when used in environments, such as hospitals, manufacturing facilities, vehicles, and other environments where motion and/or security are a concern. In order to constrain the portable computer in all six axes of freedom, the ruggedized docking station typically includes a cradle for receiving a bottom portion of the portable computer, a support plate for receiving and supporting a back side of the portable computer, and a robust latching mechanism for constraining a top portion of the portable computer. This latch typically must have tight tolerances and a high spring force to achieve the high constraint requirements of a ruggedized docking station.

Latching mechanisms used in conventional docking stations typically include a sliding latching mechanism that moves up and down along a linear axis to receive and constrain the top portion of the portable computer. To dock the portable computer, the user typically inserts the computer into the cradle and pushes the computer back towards the support plate of the docking station. When the top portion of the portable computer contacts an inclined surface of the latching mechanism, the latching mechanism is forced up along its linear axis until the top portion of the portable computer is pushed under and past the latch. When this occurs, the latching mechanism falls back down into place to secure the portable computer against the docking station.

A problem with this type of latching mechanisms is that the user must force the portable computer against the inclined surface of the latch to insert the computer into the docking station. In some cases, a significant insertion force may be needed to overcome the high spring force attributed to the latch, and over time, repeated application of this force may cause marring of the back surface of the portable computer. The linear motion of the latch and the tight tolerances needed to constrain the portable computer may also cause the latch to drag across the front surface of the portable computer. This dragging motion combined with high spring forces further increase the insertion force needed to dock the computer and may cause marring of the front surface of the portable computer. Finally, the tight tolerances needed to constrain the portable computer may not allow the docking station to tolerate and support variations in the size, shape and surface texture of different portable computers. A need, therefore, remains for an improved latching mechanism that overcomes the problems associated with conventional linear latching mechanisms.

SUMMARY OF THE INVENTION

The present invention overcomes the limitations of the prior art by providing a docking station with an improved latching mechanism for securing a portable device within the docking station. The following description of various embodiments of the invention is not to be construed in any way as limiting the subject matter of the appended claims.

According to one embodiment, a docking station for a portable device is provided with an improved latching mechanism for securing the portable device within the docking station. While the docking station and improved latching mechanism are particularly well suited to tablet PCs, the inventive concepts disclosed herein could be used with any other type of portable computer or portable electronic devices that can be docked. For the purpose of this disclosure and the appended claims, the term "portable device" shall be considered to include all types of portable computers and all types of portable electronic devices that can be docked in a docking station, as described herein.

In general, the improved latching mechanism may be described as a cam-follower mechanism, which translates a rotational motion of a cam actuator into a linear motion of a latch (the follower) that extends out of the docking station after the portable device passes the latch to secure the portable device within the docking station.

In particular, the improved latching mechanism may be described as including a cam actuator having a curved lower surface and contoured upper surface. The cam actuator may be configured to rotate about a rotational axis when a back surface of the portable device contacts and pushes against the curved lower surface of the cam actuator (i.e., when the portable device is in the process of being docked). Unlike in conventional latching mechanisms, the curved lower surface of the cam actuator is configured to roll against the back surface of the portable device when the portable device is being docked. This rolling action greatly reduces the insertion forces needed to dock the portable device and provides very little friction across the back surface of the device to minimize marring thereof. The curved lower surface of the cam actuator also enables the improved latching mechanism to better tolerate variations in the size, shape and surface texture of different portable devices (or portable devices used with or without various protective covers). Conventional latching mechanisms are not as forgiving.

The improved latching mechanism described herein also includes a latch assembly, which is configured to translate a rotational motion of the cam actuator into a linear motion, which causes a hidden latch portion of the latch assembly to extend out of the docking station for securing the portable device within the docking station. A lower surface of the latch assembly may be generally described as having a projection and a cavity arranged adjacent to the projection. In order to translate the rotational motion of the cam actuator into a linear motion of the latch assembly, the contoured upper surface of the cam actuator provides a defined profile for the projection to traverse.

For example, the contoured upper surface of the cam actuator comprises an indentation that provides a resting place for the projection of the latch assembly to sit when the latching mechanism is in the unsecured position. When the portable device is in the process of being docked, the cam actuator rotates about its' axis, causing the projection of the latch assembly to traverse a convex curvature of the contoured upper surface of the cam actuator. The convex curvature may provide a smooth rise as the projection traverses the convex curvature, and may cause the latch assembly to be pushed upwards (or rise away from the rotational axis), until the projection is pushed past an abrupt drop-off, which causes the latch assembly to return back towards the rotational axis until the contoured upper surface of the cam actuator rests the cavity of the latch assembly. When this occurs, the hidden latch portion is released to extend out of the docking station for securing the portable device in a secured position.

Unlike conventional latching mechanisms, the hidden latch portion remains substantially concealed within the docking station until the portable device is pushed past a translational axis of the hidden latch portion. The translational axis is the axis through which the hidden latch portion moves substantially linearly in and out of the docking station. This reduces friction between the portable device and the hidden latch portion by allowing the hidden latch portion to drop down vertically without dragging along a front surface of the portable device. The latching mechanism then remains in the secured position until a user presses a release button portion of the latch assembly.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
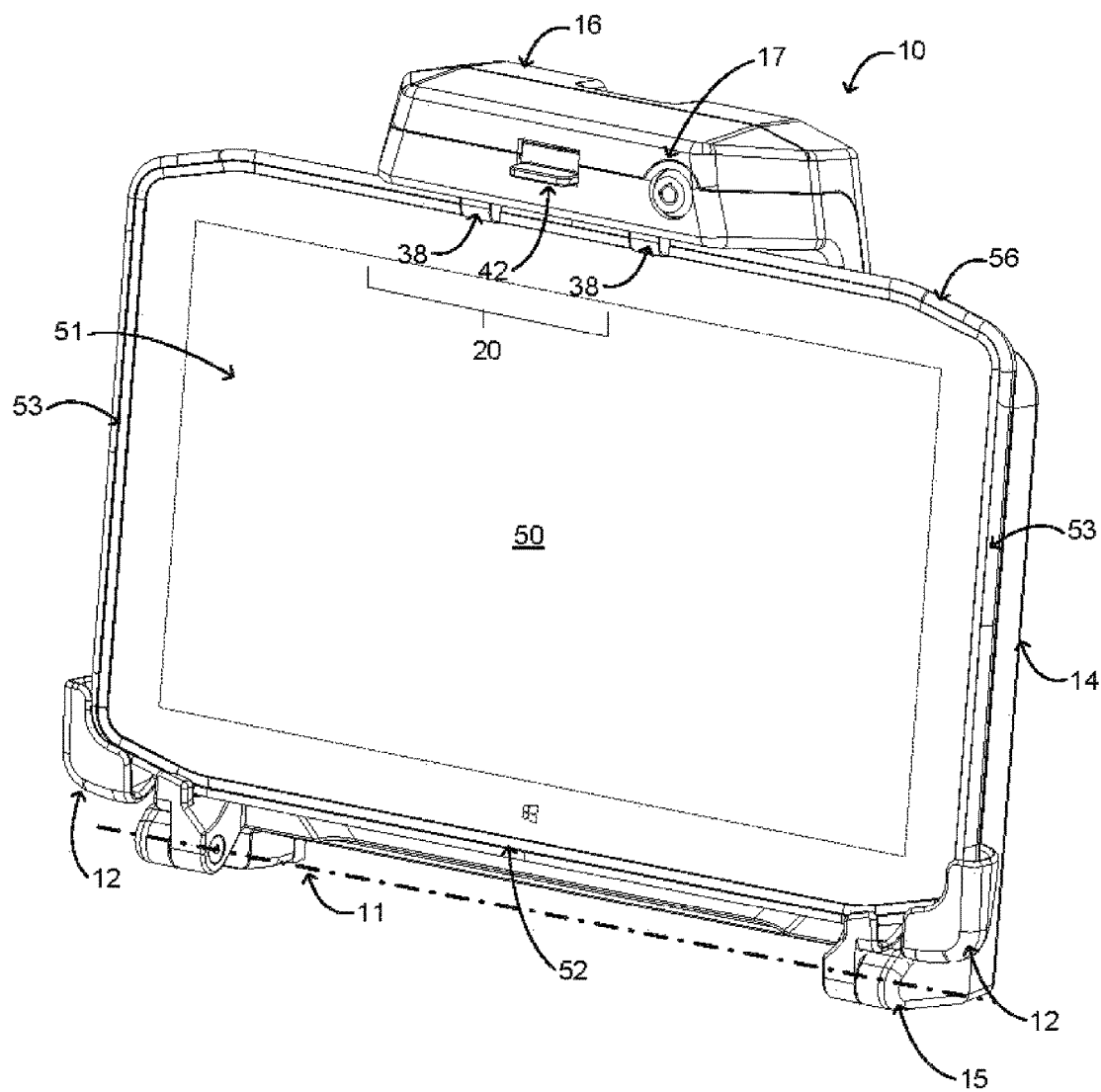
FIG. 1 is a front perspective view of a docking station and a portable computer docked therein, according to one embodiment.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIGS. 1-9 illustrate one embodiment of a docking station with an improved latching mechanism for securing a portable device. The latching mechanism described herein represents a significant improvement over conventional latching mechanisms by avoiding the high insertion forces typically needed to dock the portable device, reducing friction between the portable device and the latching mechanism, and reducing or eliminating marring of the cosmetic surfaces of the portable device. The latching mechanism described herein also tolerates variations in the size, shape and surface texture of different portable devices, or portable devices used with or without various protective covers. Although the portable device illustrated in FIGS. 1-9 is a portable computer (specifically, a tablet PC), a docking station with the improved latching mechanism may be configured for securely retaining substantially any portable device that can be docked. Examples of such portable devices may include, but are not limited to, smart phones, portable music players (e.g., an mp3 player), e-readers, and netbooks.

Figure 2:
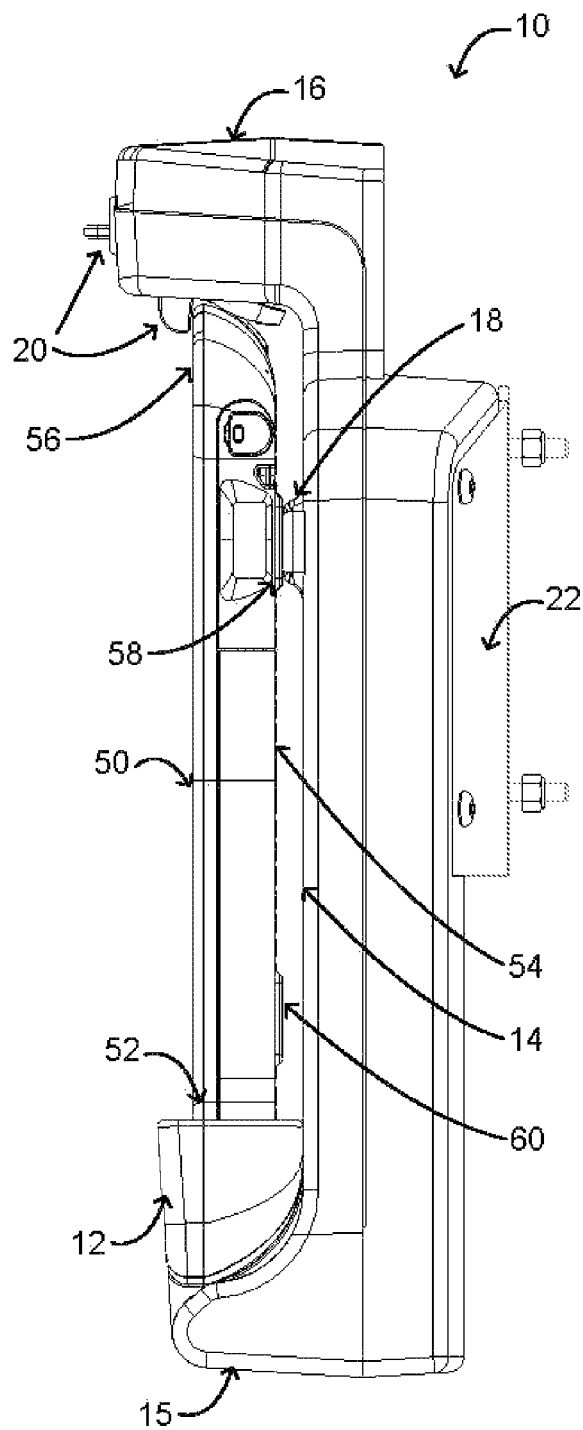
FIG. 2 is a side view of the docking station and portable computer shown in FIG. 1.

FIG. 1 is a front perspective view of a portable computer 50 inserted or "docked" within a docking station 10 comprising an improved latching mechanism, according to one embodiment of the invention. FIG. 2 is a side view of the docking station 10 and portable computer 50 shown in FIG. 1. As shown in FIGS. 1-2, docking station 10 generally includes a cradle 12 for receiving a bottom portion 52 of the portable computer 50, a support surface 14 for receiving and supporting a back surface 54 of the portable computer 50, and a top portion 16 comprising a robust latching mechanism 20 for constraining a top portion 56 of the portable computer 50.

As described in more detail below with regard to FIGS. 3-9, latching mechanism 20 may be generally described as a cam-follower mechanism, which translates a rotational motion of a cam actuator into a linear motion of a latch assembly (the follower). To avoid marring surfaces of the portable computer 50, the latch assembly comprises a hidden latch portion that extends out of the docking station only after a front surface of the portable computer passes a translational axis of the latch to secure the portable computer within the docking station 10.

Since many portable computers and portable electronic devices allow the screen orientation to be changed (e.g., between one or more landscape orientations and one or more portrait orientations), the terms "bottom portion" and "top portion" of the portable computer may seem relative to the current screen orientation. To avoid ambiguity, the "bottom portion" 52 of portable computer 50 may be generally defined as the portion comprising the docking connector or other input/output port used for communicating data and/or power between the portable computer and the docking station 10. As the docking connector and port(s) are generally arranged along an edge of the portable computer, the edge comprising the docking connector and port(s) will be defined herein as a bottom edge of portable computer 50. Conversely, a "top portion" 56 of portable computer 50 may be defined as the portion comprising the top edge of the portable computer 50, wherein the top edge is described as being parallel with and opposing the bottom edge of the portable computer.

In addition to top and bottom edges, portable computer 50 may be further described as having side edges, a front surface and a back surface. The "side edges" 53 of portable computer 50 are generally parallel with each other and perpendicular to the top and bottom edges of the portable computer 50. A "front surface" 51 of the portable computer 50 is the exterior surface comprising the display screen, and the "back surface" 54 of portable computer 50 is the exterior surface parallel with and opposing the "front surface" 51.

In some embodiments, the "bottom portion" 52 of the portable computer 50 may comprise the bottom edge of the portable computer, along with a small percentage (e.g., about 5-20%) of the lower front surface 51 and lower back surface 54. In some embodiments, the "top portion" 56 of the portable computer 50 may comprise the top edge of the portable computer, along with a small percentage (e.g., about 5-10%) of the upper front surface 51 and upper back surface 54.

The cradle 12 may be fixedly attached or pivotably coupled to a lower portion 15 of the docking station 10, and may be generally configured for supporting and/or restraining the bottom portion 52 of the portable computer 50. In the particular embodiment shown in FIGS. 1-2, the cradle 12 is configured for supporting the bottom portion 52 of the portable computer 50 only at the corners. In other embodiments, the cradle 12 may be configured for supporting other areas of the bottom portion 52 (such as a middle area of the bottom portion 52), or may extend along the entire bottom portion 52 from corner to corner. In all such embodiments, the cradle 12 may be configured for restraining movement of the bottom portion 52 of the portable computer 50 when the bottom portion 52 is inserted and docked within the cradle 12.

In some embodiments, cradle 12 may comprise a substantially U-shaped cross-section in a vertical plane, which is perpendicular to the front surface 51 of the portable computer 50. When the bottom portion 52 of the portable computer 50 is inserted within the walls of this U-shaped cross-section, the bottom portion 52 is restrained from movement in a back and forth direction (i.e., towards and away from the support surface 14 of the docking station 10). In some embodiments, cradle 12 may comprise a substantially U-shaped cross-section in a horizontal plane, which is perpendicular to the front surface 51 of the portable computer 50. When the side edges 53 of the portable computer 50 are inserted between the walls of this U-shaped cross-section, the bottom portion 52 is restrained from movement in a lateral direction (i.e., parallel with the support surface 14 of the docking station 10). The cradle 12 shown in FIGS. 1-2 restrains movement of the bottom portion 52 along two different degrees of freedom (i.e., back/forth and side/side). While such an embodiment is preferred, one skilled in the art would understand how the cradle could be alternatively configured to restrain movement of the bottom portion 52 along only one degree of freedom.

In order to assist with the insertion of the portable computer 50 into the docking station 10, cradle 12 may be configured to rotate about axis 11, as shown in FIG. 1. For example, cradle 12 may be rotated about axis 11 away from the support surface 14 of docking station 10 to allow a user to more easily insert the bottom portion 52 of the portable computer 50 into the cradle 12. Once inserted into the cradle 12, the portable computer 50 and cradle 12 may be rotated back about axis 11 towards the support surface 14 of the docking station 10 until the top portion 56 of the portable computer 50 contacts and activates the latching mechanism 20 to secure the top portion 56 of the portable computer 50. One exemplary embodiment of a rotating cradle is described in co-pending application Ser. No. 14/667,107, which is entitled "Portable Electronic Device and Docking Station with Improved Docking and Retention Features" and incorporated herein in its entirety.

In addition to a rotating cradle, the docking station described in co-pending application Ser. No. 14/667,107 conceals a floating docking connector within a recess of the rotating cradle when the cradle is rotated away from the support surface of the docking station, and extends at least a portion of the floating docking connector out of the recess to engage a docking connector on the portable computer when the cradle is rotated back towards the support surface of the docking station. Together, the rotating cradle and floating docking connector provide a mechanism, which improves docking by translating a rotational motion of the cradle into a linear, compressive force, which is used to engage the docking connectors. In addition to assisting in the alignment and engagement of the respective docking connectors, the mechanism reduces frictional forces on and avoids damage to the docking connectors.

Although desirable in some embodiments of the present invention, a docking station having the improved latching mechanism 20 described herein is not required to use a rotating cradle and a floating docking connector, as described in the co-pending application. In some embodiments, a rotating cradle 12 may be used with or without a floating docking connector. If a floating docking connector is not included, a stationary docking connector may be fixedly attached to the rotating cradle 12 or the back surface of the docking station. In other embodiments, cradle 12 may be fixed, and thus, not allow the portable computer 50 and cradle 12 to rotate about axis 11. If cradle 12 is fixed, a stationary docking connector may be fixedly attached to the cradle 12 or the back surface of the docking station, or a floating docking connector may be used to assist in the alignment of the respective docking connectors.

In some embodiments, the cradle 12 and the latching mechanism 20 may provide sufficient restraint to constrain the portable computer 50 within the docking station 10 along all three degrees of translational freedom (i.e., side-to-side, up and down, forwards and backwards). In other embodiments, additional stability may be achieved through the use of magnetic structures positioned on the back surface 54 of the portable computer 50 and the support surface 14 of the docking station. Exemplary embodiments of a portable computer and a docking station having such magnetic structures are also described in the co-pending application mentioned above.

As shown in FIG. 2, for example, a magnetic structure 58 may be arranged on the back surface 54 of the portable computer 50 and positioned so as to align with and contact a magnetic structure 18 arranged on the support surface 14 of the docking station. As used herein, a "magnetic structure" is a structure that either generates a magnetic field, or is susceptible to a magnetic field. In some embodiments, the portable computer 50 and the docking station 10 may each include one magnet (e.g., magnets 58 and 18) that are aligned and configured to contact one another when the portable computer is docked. In other embodiments, the portable computer 50 and/or the docking station 10 may each include two or more magnets, such as magnets 58 and 60 shown on the back surface 54 of portable computer 50 in FIG. 2. In yet other embodiments, one or more magnets may be used in docking station 10 for magnetically adhering to one or more metal feet (also considered to be "magnetic structures") formed on the back surface 54 of the portable computer 50 (or vice versa). Substantially any combination and/or number of magnetic structures is envisioned on portable computer 50 and docking station 10, as long as at least one magnetic structure on portable computer 50 aligns with at least one magnetic structure on docking station 10.

In the particular embodiment shown in FIG. 2, docking station 10 includes means 22 for fixedly attaching the docking station 10 to another structure. The attachment means 22 shown specifically in FIG. 2 includes attachment plate(s) and screws for mounting the docking station 10 onto, e.g., a vehicle console, a stand, a rolling cart, a wall or ceiling mounted bracket, etc. Alternative attachment means 22 not specifically illustrated herein may also be used to secure the docking station 10 to another structure. In other embodiments, attachment means 22 may be omitted when docking station 10 is configured with a stand or base (not shown) for supporting the docking station on a table or other horizontal surface.

Figure 3:
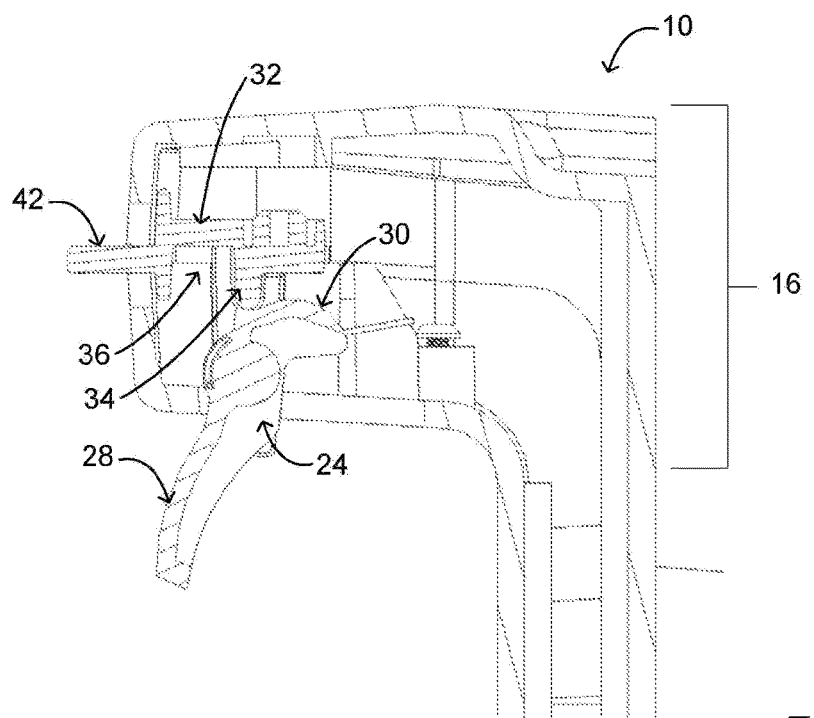
FIG. 3 is a cross sectional view through a top portion of the docking station shown in FIG. 1, illustrating the improved latching mechanism in an unsecured position, prior to insertion of the portable computer.
Figure 4:
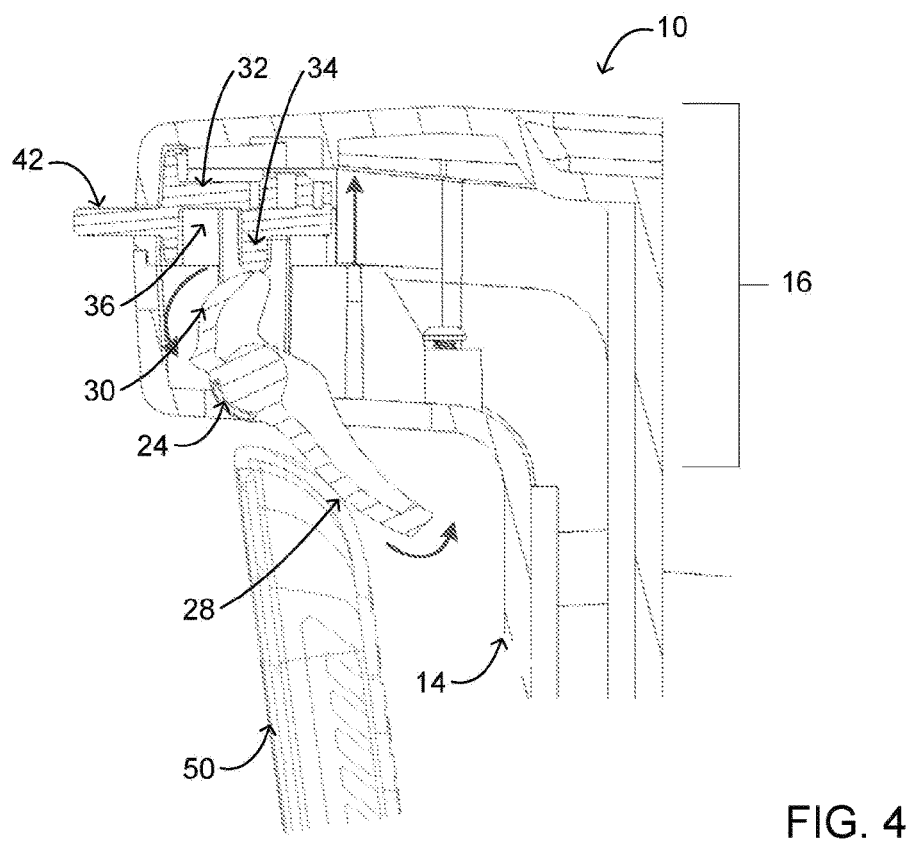
FIG. 4 is a cross sectional view through the top portion of the docking station shown in FIG. 1, illustrating how the components of the improved latching mechanism interrelate to receive and latch the portable computer.
Figure 5:
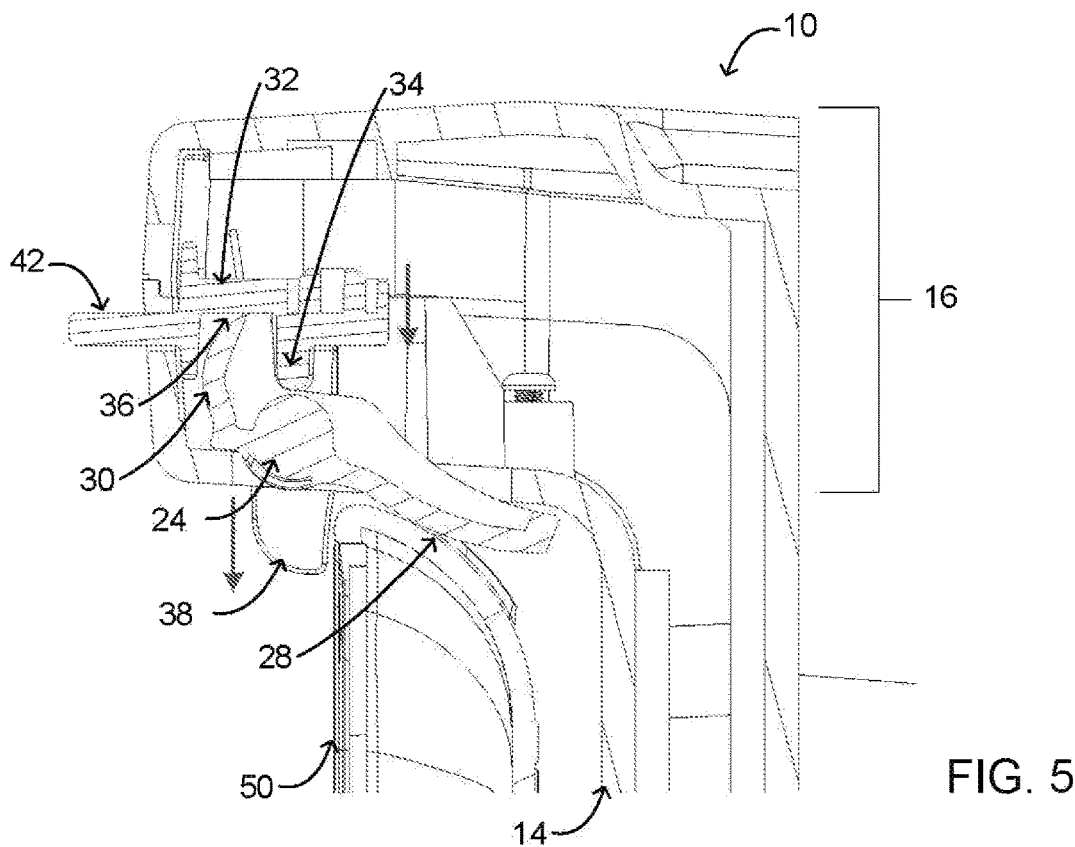
FIG. 5 is a cross sectional view of the top portion of the docking station shown in FIG. 1, illustrating the improved latching mechanism in a secured position after the portable computer is inserted into the docking station and secured by the latching mechanism.
Figure 6:
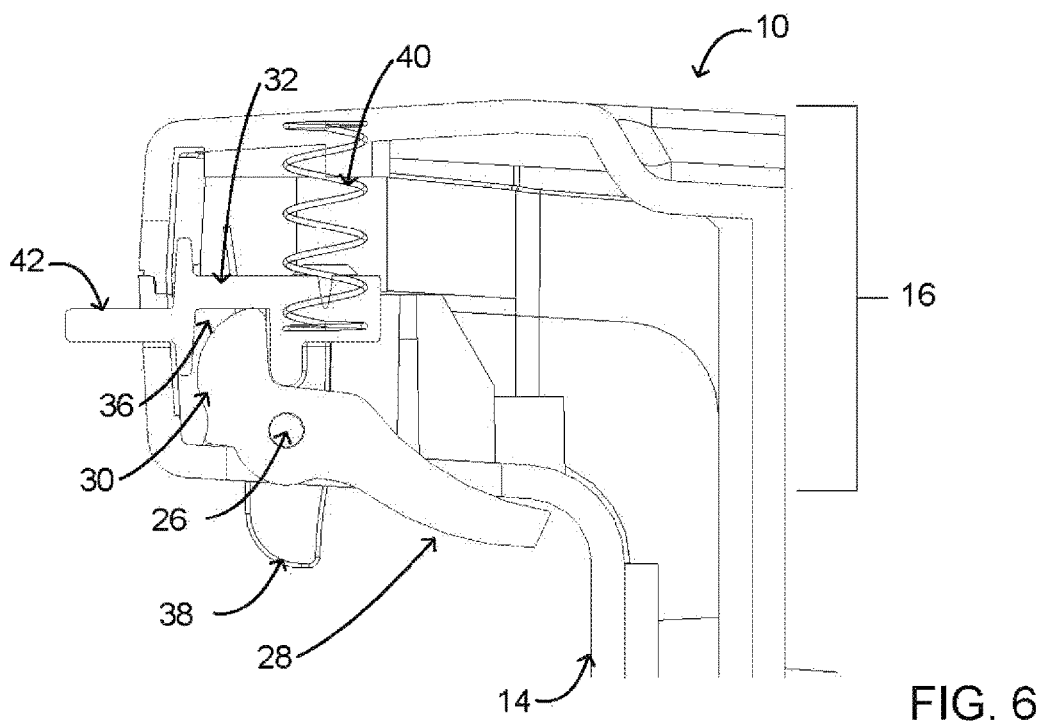
FIG. 6 is a cross sectional view of the top portion of the docking station shown in FIG. 1, emphasizing a spring used to bias the latching mechanism.

FIGS. 3-6 illustrate various components of the improved latching mechanism 20 and how they interrelate to receive and securely latch the portable computer 50 within the docking station 10. In particular, FIG. 3 is a cross sectional view of the top portion 16 of docking station 10 illustrating the improved latching mechanism 20 in an unsecured position prior to insertion of the portable computer 50 into the docking station 10. FIG. 4 is another cross sectional view through the top portion 16 of the docking station 10 shown in FIG. 1, showing the top portion 56 of the portable computer 50 coming in contact with the latching mechanism 20 as the portable computer 50 is being pushed back towards the support surface 14 of the docking station 10. FIG. 5 is another cross sectional view of the top portion 16 of the docking station 10 shown in FIG. 1, illustrating the improved latching mechanism 20 in a secured position after the portable computer 50 is inserted into the docking station 10 and the top portion 56 of the portable computer 50 is secured by the latching mechanism 20. FIG. 6 is another cross sectional view of the top portion 16 of the docking station 10 shown in FIG. 1, illustrating a means for biasing the latching mechanism 20.

As shown in FIGS. 3-6, the improved latching mechanism 20 described herein comprises a pivotable lever 24 and a latch assembly 32, which is operatively coupled to the pivotable lever and at least partially contained within the top portion 16 of the docking station. As shown in FIG. 6, pivotable lever 24 is coupled within the top portion 16 of the docking station 10 by a pin 26 that allows the pivotable lever 24 to rotate about a rotational axis (i.e., the longitudinal axis of the pin) when the back surface 54 of the portable computer 50 contacts and pushes against a lower surface 28 of the pivotable lever. Although not apparent in the cross-section of FIG. 6, the pin 26 is attached to an interior surface of the top portion 16 of docking station 10. This enables the pivotable lever 24 to rotate about the pin 26, while restricting further movement of the pivotable lever 24. In other words, while the pivotable lever 24 may rotate about pin 26, it remains in a fixed location and cannot move up and down or side to side.

In one embodiment, the lower surface 28 of the pivotable lever 24 is curved, so that it rolls against the back surface 54 of the portable computer 50 when the portable computer is inserted into the cradle 12 of the docking station 10 and pushed back towards the support surface 14 of the docking station. This rolling action greatly reduces the insertion forces needed to dock the portable computer and provides very little friction across the back surface 54 of the computer to minimize marring thereof. An upper surface 30 of the pivotable lever 24 is configured to contact and roll against a lower surface of the latch assembly 32. As shown in FIG. 3, the lower surface of the latch assembly 32 generally includes a projection 34 and a cavity 36 arranged adjacent to the projection. The upper surface 30 of the pivotable lever 24 is preferably contoured and provides a defined profile over which the projection 34 travels to translate a rotational motion of the pivotable lever 24 into a linear motion of the latch assembly 32.

The pivotable lever 24 and latch assembly 32 operate together as a cam-follower mechanism. The contoured upper surface 30 of the pivotable lever (i.e., the cam actuator) 24 has a defined profile for the projection (i.e., the follower) 34 to traverse when the pivotable lever 24 is rotated about its' axis. In the particular embodiment shown in FIGS. 3-6, the defined profile of the upper surface 30 comprises an indentation that provides a resting position for projection 34 to sit when the latching mechanism 20 is in an unsecured position (see, FIG. 3), a convex curvature that provides a smooth rise as the projection 34 traverses the convex curvature (see, FIG. 4), and an abrupt drop-off at one end of the convex curvature that provides a position for the projection 34 to dwell when the latching mechanism is in a secured position (see, FIG. 5).

When the user is in the process of docking the portable computer 50, the back side 54 of the portable computer 50 contacts the contoured lower surface 28 of the pivotable lever (i.e., the cam actuator) 24 and pushes the lower surface 28 back towards the support surface 14 of the docking station 10. When this occurs, pivotable lever 24 rotates about the rotational axis of pin 26, causing projection 34 to traverse the defined profile of the contoured upper surface 30 of the pivotable lever 24. This action causes latch assembly 32 to rise away from the rotational axis until projection 34 is pushed past the abrupt drop-off, which causes latch assembly 32 to return back towards the rotational axis until the contoured upper surface 30 of the pivotable lever 24 rests within the cavity 36.

In the illustrated embodiment, the latch assembly 32 is pushed upwards (denoted by the vertical arrow shown in FIG. 4), until the upper surface 30 of the pivotable lever 24 pushes past the projection 34 and the latch assembly 32 falls back down to move the upper surface 30 into the cavity 36, as shown in FIG. 5. When the upper surface 30 of the pivotable lever 24 moves into the cavity 36, the downward, linear motion (denoted by the vertical arrow shown in FIG. 5) of the latch assembly 32 causes a hidden latch portion 38 of the latch assembly 32 to extend down and out of the top portion 16 of the docking station 10 for securing the portable computer 50 therein. Importantly, the latch portion 38 remains substantially hidden within the top portion 16 of the docking station until the portable computer 50 is pushed past a translational axis of the latch portion 38. This reduces friction between the portable computer 50 and the hidden latch portion 38 by allowing the hidden latch portion 38 to drop down vertically without dragging along the front surface of the portable computer. The translational axis is the axis through which the hidden latch portion 38 moves substantially linearly in and out of the docking station.

The latching mechanism 20 remains in the secured position shown in FIG. 5 until the user presses a release button portion 42 of the latch assembly 32 to undock the computer. When the user wishes to undock the portable computer 50, the user need only apply an upward force to the release button portion 42 of the latch assembly 32 to remove the upper surface 30 of the pivotable lever 24 from the cavity 36, and allow the latching mechanism 20 to return to the unsecured position shown in FIG. 3. In some embodiments, the release button portion 42 may be confined in a locked position by an integrated key lock 17, as shown in FIG. 1. While the key lock 17 may enhance security, it is not necessary and may be omitted in other embodiments.

As shown in FIG. 6, the linear motion of the latch assembly 32 is biased by a spring force provided by a spring 40, which is coupled between an upper surface of the latch assembly 32 and an inner surface of the docking station 10. When the latch assembly 32 is pushed upward by the rotational motion of the pivotable lever 24 (as shown in FIG. 4), a downward spring force is applied by the spring 40 to force the latch assembly 32 downwards, assist in positioning the upper surface 30 of the pivotable lever 24 within the cavity 36, and extend the hidden latch portion 38 down and out of the top portion 16 of the docking station 10 to secure the portable computer 50 in a secured position, as shown in FIG. 5. When the upper surface 30 of the pivotable lever 24 is positioned within the cavity 36, an opposite spring force (e.g., an upward spring force) is applied to the latch assembly 32. This upward spring force is not sufficient to release the latching mechanism 20 from the secured position until the release button portion 42 of the latch assembly 32 is triggered by the user to undock the portable computer 50. However, this upward spring force may be sufficient to help eject the portable computer 50 when the release button portion 42 is triggered.

In the embodiments illustrated in FIGS. 1-6, latching mechanism 20 is coupled within a top portion 16 of the docking station 10 for restraining a top portion 56 of the portable computer 50. Although illustrated and described as such, one skilled in the art would understand how the improved latching mechanism described herein could be alternatively coupled to other portions of the docking station 10 for restraining other portions of the portable computer 50. For example, if top portion 16 were omitted, docking station 10 could alternatively include one or more side portions (not shown), which extend laterally from support surface 14 and include one or more latching mechanisms. The latching mechanisms included within the side portions would be configured, and would function essentially the same as described above for latching mechanism 20 with one exception. Instead of translating a rotational movement of the pivotable lever 24 into a vertically linear motion, the latching mechanism(s) included within the side portion(s) would translate rotational movement of a pivotable lever into a horizontally linear motion of the latch assembly.

Figure 7:
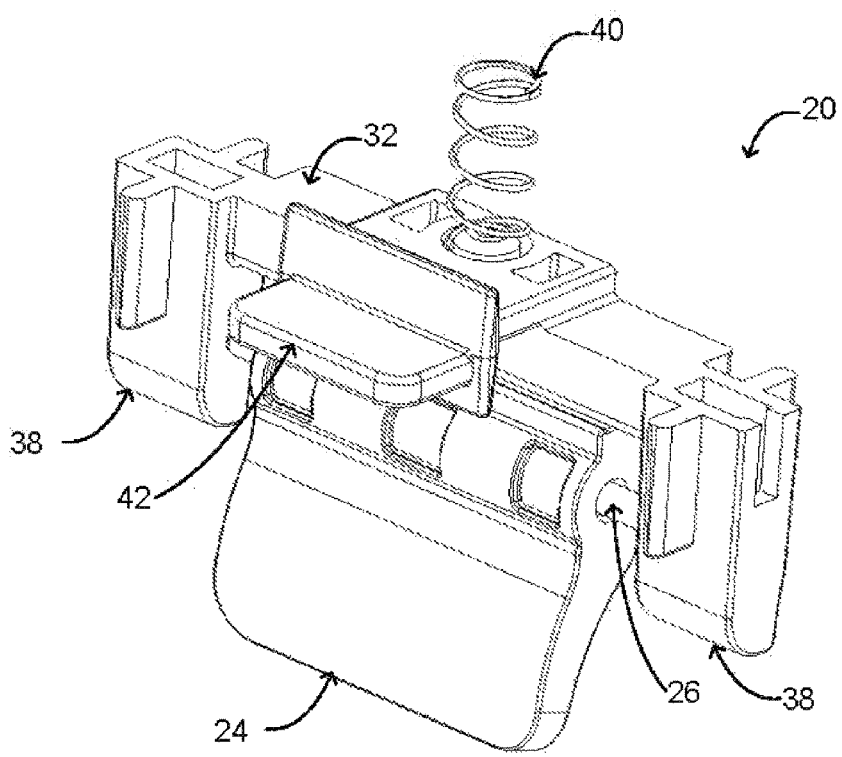
FIG. 7 is a front perspective view of the latching mechanism (alone) in the unsecured position, prior to insertion of the portable computer.
Figure 8:
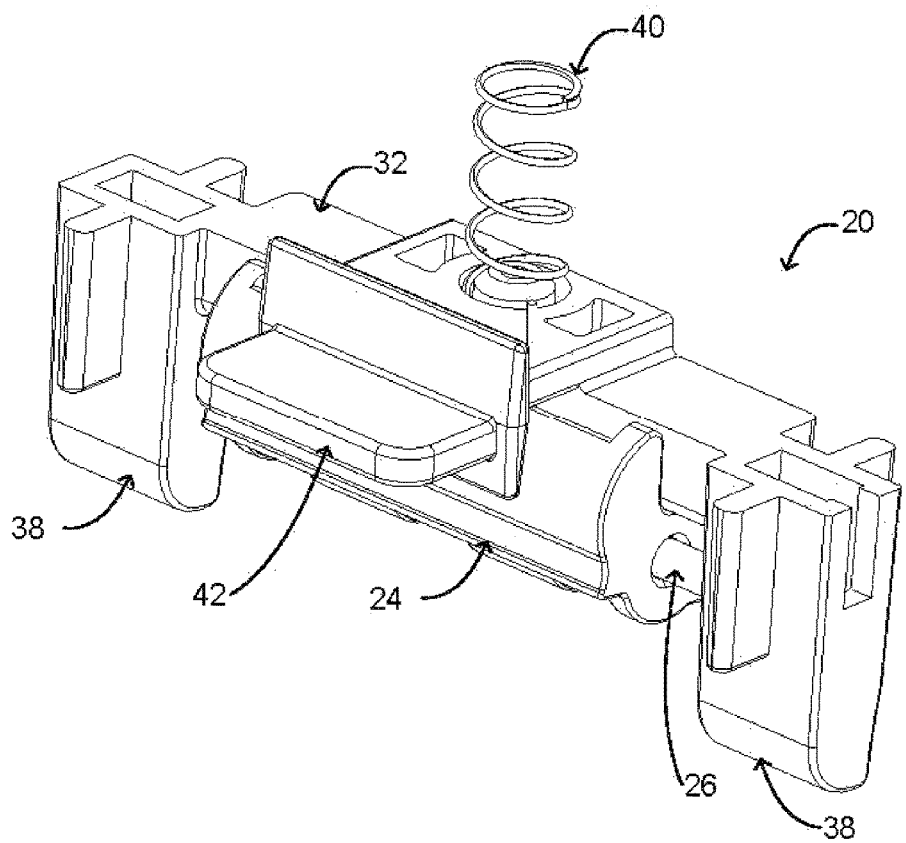
FIG. 8 is a front perspective view of the latching mechanism (alone) in the secured position after the portable computer is inserted into the docking station and secured by the latching mechanism.
Figure 9:
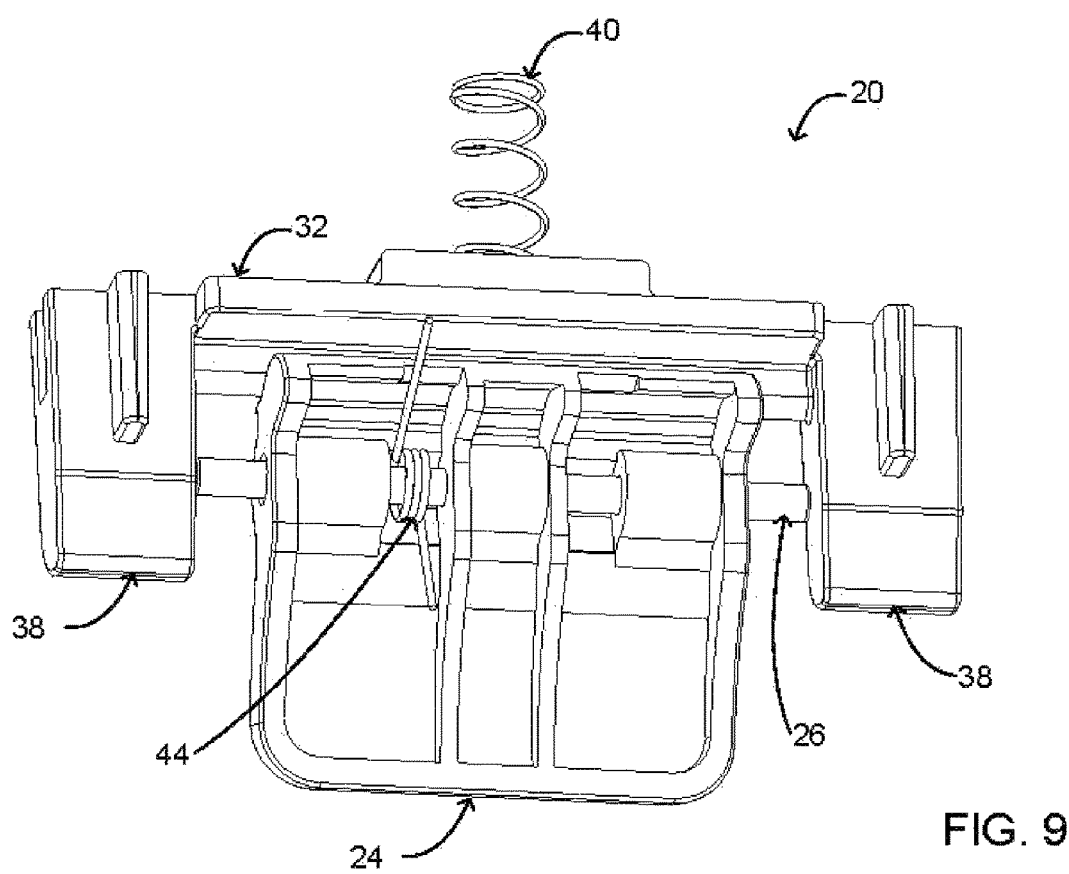
FIG. 9 is a back perspective view of the latching mechanism showing the torsion spring coupled between elements of the latching mechanism.

FIGS. 7-9 are perspective views of the latching mechanism 20 alone. In particular, FIG. 7 is a front perspective view of the latching mechanism 20 in the unsecured position, prior to insertion of the portable computer. FIG. 8 is a front perspective view of the latching mechanism 20 in the secured position after the portable computer is inserted into the docking station and secured by the latching mechanism. FIG. 9 is a back perspective view of the latching mechanism in the unsecured position.

As shown in FIGS. 7-9, the projection 34, the cavity 36, the hidden latch portion 38 and the release button portion 42 of the assembly 32 are preferably formed as one integral piece. According to one embodiment, the latch assembly 32 may be formed from a plastic material using a variety of different means, such as an injection molding, extrusion or a 3D printing process, for example. Alternatively, latch assembly 32 may be formed from a metal or metal alloy material using a variety of different metal fabrication techniques. Regardless of the material and process used, forming the latch assembly as one integral piece greatly simplifies the mechanics of the latching mechanism and reduces the likelihood of the mechanism breaking down.

FIGS. 7-9 also illustrate how the pivotable lever 24 interacts with the latch assembly 32 as the pivotable lever 24 rotates around the pin 26. Although not shown in FIGS. 7-9, the pin 26 may be attached to an interior surface of the docking station at two locations, one on either side of the pivotable lever 24 between the pivotable lever and the hidden latches 38. As noted above, attaching the pin 26 in such a manner enables the pivotable lever 24 to rotate about the pin 26, while restricting further movement of the pivotable lever 24. This ensures that only the latch assembly 32 moves up and down as the pivotable lever 24 rotates.

When the pivotable lever 24 rotates about the pin 26 from the unsecured position (FIG. 7) to the secured position (FIG. 8), the entire latch assembly 32 rises away from and drops back down towards the rotational axis of the pin 26 as the projection 34 traverses the contoured upper surface 30 of the pivotable lever 24 (as shown in FIGS. 4-5). When the latch assembly 32 is pushed upward by the rotational motion of the pivotable lever 24 (as shown in FIG. 4), the downward spring force applied by the spring 40 forces the entire latch assembly 32 downwards, which assists in positioning the upper surface 30 of the pivotable lever 24 within the cavity 36, and extends the hidden latch portion 38 down and out of the top portion 16 of the docking station 10 to secure the portable computer 50 in the secured position. However, the hidden latch portion 38 extends out of the top portion 16 of the docking station 10 only after a front surface 51 of the portable computer 50 surpasses a translational axis of the hidden latch portion 38, so as to minimize marring of the front surface 51. The translational axis is the axis through which the hidden latch portion 38 moves substantially linearly in and out of the docking station.

As shown in FIG. 9, a torsion spring 44 is wound around the pin 26 and coupled to provide a spring force between the pivotable lever 24 and the latch assembly 32. In addition to providing a necessary amount of resistance to assist in securely latching the portable computer 50 within the docking station 10, the torsion spring 44 may assist in ejecting the portable computer 50 from the docking station 10 when the release button portion 42 is actuated. Although one torsion spring 44 is shown in FIG. 9, one skilled in the art would understand how an additional torsion spring may be added to increase the force with which the portable computer 50 is ejected from the docking station 10.

The latching mechanism 20 described herein represents a significant improvement over conventional latching mechanisms, which require a back surface of the portable computer to be forced against an inclined surface of a sliding latch mechanism to move the latch portion upwards or downwards for receiving the portable computer. Instead of forcing the portable computer against a sliding latch mechanism, the improved latching mechanism described herein uses a pivotable lever (i.e., a cam actuator) 24 to translate a rotational motion of the pivotable lever into a linear motion of a latch assembly 32 that allows a hidden latch portion 38 to extend out of the docking station 10 only after a front surface of the portable computer surpasses a translational axis of the hidden latch portion 38.

Specifically, the pivotable lever 24 is provided with a curved lower surface 28 that is configured to roll against a back surface 54 of a portable computer 50 when the portable computer is inserted into the cradle 12 of the docking station 10 and pushed backwards towards the support surface 14 of the docking station. This rolling action greatly reduces the insertion forces needed to dock the portable computer 50 and provides very little friction across the back surface 54 of the computer to minimize marring thereof. In addition, the curved lower surface 28 of the pivotable lever 24 enables the improved latching mechanism 20 to better tolerate variations in the size, shape and surface texture of different portable computers, portable computers used with or without various protective covers, and possibly different types of portable devices.

As another improvement over conventional latching mechanisms, the improved latching mechanism 20 is also provided with a hidden latch portion 38. As noted above, the hidden latch portion 38 remains substantially concealed within the docking station 10 until a front surface 51 of the portable computer 50 surpasses a translational axis of the hidden latch portion. This reduces marring of the front surface 51 of the portable computer when the latch portion 38 is released by preventing the latch portion 38 from dragging along the front surface. Additional advantages may be apparent to those skilled in the art.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A docking station for a portable device, the docking station comprising a latching mechanism for securing the portable device within the docking station, the latching mechanism comprising:
    a cam actuator having a curved lower surface and contoured upper surface, wherein the cam actuator is configured to rotate about a rotational axis when a back surface of the portable device contacts and pushes against the curved lower surface of the cam actuator; and
    a latch assembly configured to translate a rotational motion of the cam actuator into a linear motion of the latch assembly, which causes a hidden latch portion of the latch assembly to extend linearly out of the docking station for securing the portable device within the docking station.

2. The docking station as recited in claim 1, wherein the latching mechanism further comprises a spring coupled between an interior surface of the docking station and an upper surface of the latch assembly, wherein the spring provides a spring force for biasing the linear motion of the latch assembly.

3. The docking station as recited in claim 1, wherein the cam actuator is configured to rotate about a pin, which is attached to an interior surface of the docking station and which provides the rotational axis.

4. The docking station as recited in claim 3, wherein the latching mechanism further comprises a torsion spring, which is wound around the pin and configured to provide a spring force between the cam actuator and the latch assembly.

5. The docking station as recited in claim 1, wherein a lower surface of the latch assembly comprises a projection and a cavity arranged adjacent to the projection.

6. The docking station as recited in claim 5, wherein the contoured upper surface of the cam actuator has a defined profile comprising:
    an indentation that provides a resting position for the projection to sit when the latching mechanism is in an unsecured position;
    a convex curvature that provides a smooth rise as the projection traverses the convex curvature; and
    an abrupt drop-off at one end of the convex curvature that provides a position for the projection to dwell when the latching mechanism is in a secured position.

7. The docking station as recited in claim 6, wherein as the cam actuator rotates about the rotational axis, the projection traverses the defined profile of the contoured upper surface of the cam actuator, causing the latch assembly to rise away from the rotational axis until the projection is pushed past the abrupt drop-off, which causes the latch assembly to return back towards the rotational axis until the contoured upper surface of the cam actuator rests within the cavity.

8. The docking station as recited in claim 7, wherein when the contoured upper surface of the cam actuator moves into the cavity, the hidden latch portion extends linearly out of the docking station for securing the portable device in the secured position.

9. The docking station as recited in claim 7, wherein the latch assembly further comprises a release button portion, which when pressed releases the contoured upper surface of the cam actuator from the cavity and enables the latching mechanism to return to the unsecured position.

10. The docking station as recited in claim 9, wherein the release button portion, the hidden latch portion, the projection and the cavity of the latch assembly are formed as one integral piece.

11. A docking station for a portable device, the docking station comprising:
   a support surface configured for supporting a back surface of the portable device;
   a cradle coupled to a lower portion of the docking station and configured for receiving a bottom portion of the portable device; and
   a latching mechanism coupled to a portion of the docking station and configured for restraining a portion of the portable device, wherein the latching mechanism comprises:
      a pivotable lever configured to rotate about a first rotational axis when the back surface of the portable device contacts and pushes against a curved lower surface of the pivotable lever; and
      a latch assembly operatively coupled to the pivotable lever, wherein rotation of the pivotable lever about the first rotational axis causes a hidden latch portion of the latch assembly to extend linearly out of the docking station for securing the portable device only after a front surface of the portable device surpasses a translational axis of the hidden latch portion.

12. The docking station as recited in claim 11, wherein the latching mechanism further comprises a spring coupled between an interior surface of the docking station and an upper surface of the latch assembly, wherein the spring provides a spring force that assists in extending the hidden latch portion out of the docking station.

13. The docking station as recited in claim 11, wherein the pivotable lever is configured to rotate about a pin, which is attached to an interior surface of the docking station and which provides the first rotational axis.

14. The docking station as recited in claim 13, wherein the latching mechanism further comprises a torsion spring, which is wound around the pin and configured to provide a spring force between the pivotable lever and the latch assembly.

15. The docking station as recited in claim 11, wherein a lower surface of the latch assembly comprises a projection and a cavity arranged adjacent to the projection.

16. The docking station as recited in claim 15, wherein a contoured upper surface of the pivotable lever has a defined profile comprising:
   an indentation that provides a resting position for the projection of the latch assembly to sit when the latching mechanism is in an unsecured position;
   a convex curvature that provides a smooth rise as the projection traverses the convex curvature; and
   an abrupt drop-off at one end of the convex curvature that provides a position for the projection to dwell when the latching mechanism is in a secured position.

17. The docking station as recited in claim 16, wherein as the pivotable lever rotates about the first rotational axis, the projection traverses the defined profile of the contoured upper surface of the pivotable lever, causing the latch assembly to rise away from the first rotational axis until the projection is pushed past the abrupt drop-off, which causes the latch assembly to return back towards the first rotational axis until the contoured upper surface of the pivotable lever rests within the cavity.

18. The docking station as recited in claim 17, wherein when the contoured upper surface of the pivotable lever moves into the cavity, the hidden latch portion extends linearly out of the docking station along the translational axis for securing the portable device in the secured position.

19. The docking station as recited in claim 17, wherein the latch assembly further comprises a release button portion, which when pressed releases the contoured upper surface of the pivotable lever from the cavity and enables the latching mechanism to return to the unsecured position.

20. The docking station as recited in claim 19, wherein the projection, the cavity, the hidden latch portion and the release button portion of the latch assembly are formed as one integral piece.

* * * * *